United States Patent
Papon et al.

(10) Patent No.: US 9,163,757 B2
(45) Date of Patent: Oct. 20, 2015

(54) HIGH-PRESSURE PIPE ELEMENT HAVING AN ASSEMBLY OF HOOPED TUBES AND METHOD OF MANUFACTURE

(75) Inventors: Gérard Papon, Les Essarts le Roi (FR); Jean Guesnon, Chatou (FR)

(73) Assignee: IFP, Rueil Malmaison Cedex (FR)

( * ) Notice: Subject to any disclaimer, the term of this patent is extended or adjusted under 35 U.S.C. 154(b) by 1365 days.

(21) Appl. No.: 12/442,711

(22) PCT Filed: Sep. 20, 2007

(86) PCT No.: PCT/FR2007/001536
§ 371 (c)(1),
(2), (4) Date: Feb. 23, 2010

(87) PCT Pub. No.: WO2008/043891
PCT Pub. Date: Apr. 17, 2008

(65) Prior Publication Data
US 2010/0139802 A1    Jun. 10, 2010

(30) Foreign Application Priority Data
Sep. 25, 2006   (FR) ...................................... 06 08446

(51) Int. Cl.
*F16L 55/16* (2006.01)
*F16L 13/02* (2006.01)
*F16L 25/00* (2006.01)

(52) U.S. Cl.
CPC ......... *F16L 13/0236* (2013.01); *F16L 13/0218* (2013.01); *F16L 25/0018* (2013.01)

(58) Field of Classification Search
USPC ............................ 138/99, 143, 146, 153, 155
See application file for complete search history.

(56) References Cited

U.S. PATENT DOCUMENTS

| | | | | |
|---|---|---|---|---|
| 3,192,080 A | * | 6/1965 | Cooper .......................... | 148/515 |
| 3,258,032 A | * | 6/1966 | Whittier et al. ............... | 138/146 |
| 3,480,493 A | * | 11/1969 | Bauer et al. ..................... | 156/78 |
| 3,731,710 A | * | 5/1973 | Bauer et al. .................... | 138/143 |
| 3,971,574 A | * | 7/1976 | Curtin .............................. | 285/31 |
| 3,989,281 A | | 11/1976 | Wilde, Jr. | |
| 4,146,060 A | * | 3/1979 | Garrett .......................... | 138/143 |
| 4,147,381 A | * | 4/1979 | Schwarz ......................... | 285/53 |
| 4,469,357 A | * | 9/1984 | Martin ........................ | 285/381.3 |
| 4,514,241 A | * | 4/1985 | Maukola .......................... | 156/79 |
| 4,514,254 A | | 4/1985 | Klepner | |
| 4,610,740 A | * | 9/1986 | Nordstrom ....................... | 156/79 |
| 4,732,412 A | * | 3/1988 | van der Linden et al. ...... | 285/47 |
| 5,079,824 A | * | 1/1992 | Lopez et al. ............... | 29/402.13 |

(Continued)

FOREIGN PATENT DOCUMENTS

FR     1 105 179       11/1955
FR     2 805 187 A1    8/2001

(Continued)

*Primary Examiner* — James Hook
(74) *Attorney, Agent, or Firm* — Fitch, Even, Tabin & Flannery, LLP

(57) ABSTRACT

The invention relates to a high-pressure pipe element having at least two metal tubes 1, 3 reinforced by hoops 2 and 4, the ends of the tubes being bare. The tubes are assembled end to end by a weld 5 of the bared ends. A sleeve 6 covers the weld 5 as some of the hooping 2 and 4 of each tube, forming an annular space between the bare ends of the tubes and the sleeve, said space being filled with a setting material 9.
The invention also relates to manufacturing the high-pressure pipe element.

10 Claims, 1 Drawing Sheet

(56) References Cited

U.S. PATENT DOCUMENTS

| | | | |
|---|---|---|---|
| 5,328,648 A * | 7/1994 | McBrien et al. | 264/35 |
| 5,452,507 A * | 9/1995 | Brunner et al. | 29/428 |
| 5,786,053 A * | 7/1998 | Andrenacci et al. | 428/36.9 |
| 6,273,144 B1 * | 8/2001 | Bohon et al. | 138/149 |
| 7,165,579 B2 * | 1/2007 | Borland et al. | 138/99 |
| 7,472,476 B2 * | 1/2009 | Gronquist | 29/825 |
| 8,418,337 B2 * | 4/2013 | Salama | 29/402.18 |
| 2001/0045239 A1 | 11/2001 | Villatte et al. | |
| 2002/0195158 A1 * | 12/2002 | Turner et al. | 138/155 |
| 2003/0024587 A1 | 2/2003 | Guesnon et al. | |
| 2003/0024628 A1 | 2/2003 | Guesnon et al. | |
| 2003/0116214 A1 * | 6/2003 | Meli et al. | 138/123 |
| 2004/0011415 A1 * | 1/2004 | Kakoschke et al. | 138/99 |
| 2006/0065320 A1 * | 3/2006 | Borland et al. | 138/99 |
| 2006/0162797 A1 * | 7/2006 | Boulet D'Auria et al. | 138/99 |
| 2009/0159146 A1 * | 6/2009 | Jackson et al. | 138/146 |
| 2010/0263761 A1 * | 10/2010 | Niccolls et al. | 138/146 |
| 2013/0192706 A1 * | 8/2013 | Poirette et al. | 138/109 |

FOREIGN PATENT DOCUMENTS

| | | |
|---|---|---|
| FR | 2 828 121 A1 | 2/2003 |
| FR | 2 828 262 A1 | 2/2003 |

\* cited by examiner

HIGH-PRESSURE PIPE ELEMENT HAVING AN ASSEMBLY OF HOOPED TUBES AND METHOD OF MANUFACTURE

The present invention relates to the production of a high-pressure pipe. In particular, the invention proposes a high-pressure pipe composed of an assembly of hooped tubes, as well as a method for manufacturing said assembly.

The hooping technique consists of winding a reinforcing element, generally in the form of a band of fibers embedded in a polymer matrix, around a metal tube in order to increase the resistance of the tube to internal pressure without significantly increasing its weight.

The use of hooped tubes for producing offshore oil deposits is particularly envisaged. The hooped tubes can be used for making pipes to convey the oil from a wellhead installed on the sea bed to a processing facility located at the sea surface. More specifically, the hooped tubes can be used to make pipes installed on the sea bed, commonly called flow lines, lines connecting the sea bed to the surface, commonly called risers, or auxiliary lines such as kill lines and choke lines whose function is to establish a hydraulic link parallel to the riser between the surface and the wellhead located on the sea bed.

The hooped tubes are made in tube sections that can be up to 20 to 30 meters long. For making high-pressure pipes, the hooped tubes are welded together end to end. In the welding operation, the hooping material located at the ends of the tube is exposed to damage from the heat released during welding. The pipe thus obtained may therefore have low mechanical strength at the welded joints.

The present invention proposes a technique of welding hooped tubes together enabling, in particular, a pipe to be made that has no weak points from the standpoint of mechanical strength.

In general, the invention proposes a high-pressure pipe element having at least two metal tubes reinforced by hoops, the ends of the tubes being bare, the tubes being assembled end to end by welding the bare ends, a sleeve covering the weld as well as a portion of the hooping of each tube forming an annular space between the bare ends of tubes and the sleeve, said space being filled with an injectable and setting material.

According to the invention, the inside surface of the sleeve can have striations. The sleeve can have ends of conical shape. The hooping can have reinforcing elements made of fibers embedded in a polymer material. The injectable and setting material can comprise a polymer.

The characteristics of the sleeve can be chosen such that the assembly constituted by the sleeve, the space filled with the injectable, setting material, and the bare ends of the tubes, has greater internal pressure resistance than that of the metal tubes reinforced by hoops The present invention also relates to a method of manufacturing a high-pressure pipe having at least two metal tubes the method including at least the following operations:

a) reinforcing elements are wound around metal tubes leaving the tube ends bare, b) the tubes are welded together end to end, c) the sleeve is positioned at the level of the weld, with the sleeve covering the weld as well as a portion of the reinforcing elements of each tube between the bare ends of the tubes and the sleeve, and d) a setting material is injected into the annular space. In step d), the setting material can be polymerized.

In step a), the reinforcing elements can be wound under tension in order to introduce a circumferential prestress into the metal tubes.

Alternatively, before step b), an internal pressure can be applied in the tubes covered with the reinforcing elements until the tubes are plastically deformed in order to introduce a circumferential prestress into the metal tubes.

Alternatively, after step d), an internal pressure can be applied in the pipe element until the metal tubes are deformed plastically in order to introduce a circumferential prestress into the metal tubes.

According to the invention, operation a) can be performed in a specialized plant, then the tubes covered with reinforcing elements can be conveyed to the assembly site, then operations b), c), and d) can be performed at the assembly site.

Other features and advantages of the invention will be better understood and will emerge clearly when reading the description hereinbelow with reference to the drawings, of which:

Figure 1:
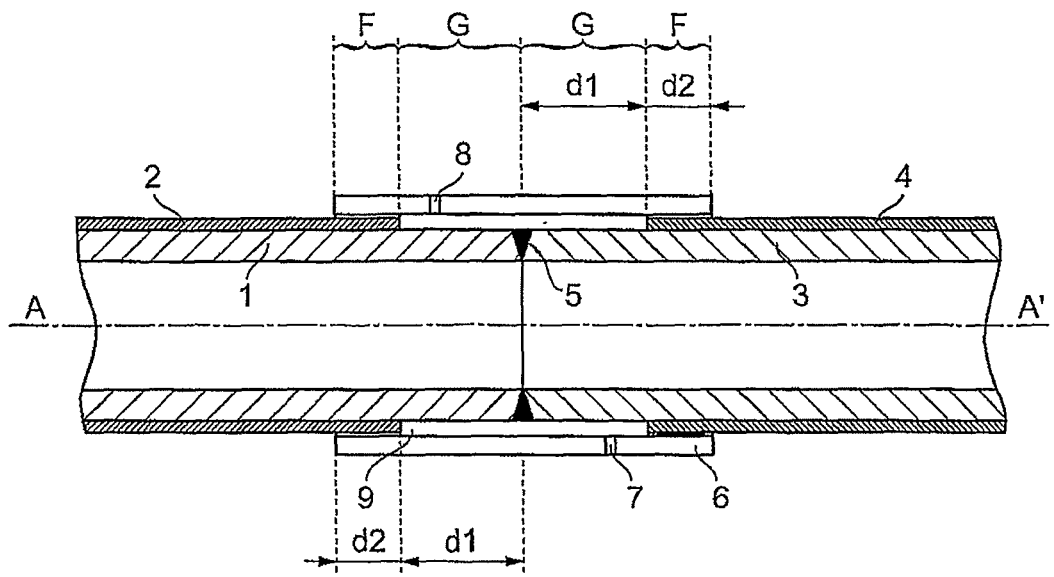
FIG. 1 shows an assembly of two hooped tubes.

In FIG. 1, the metal tubes 1 and 3 are covered with reinforcing elements 2 and 4, respectively. In general, in the oil industry, metal tubes between 10 m and 20 m in length are worked.

The reinforcing elements 2 and 4 are ribbons of composite material wound onto the outer surfaces of tubes 1 and 3. The ribbons are made of fibers, for example fiberglass, carbon, or aramide fibers, the fibers being embedded in a thermoplastic or thermosetting polymer matrix such as a polyamide.

The reinforcing elements can be wound under tension in order to introduce a circumferential prestress into the metal tubes and thus improve the resistance to internal pressure of the metal tubes. A tube hooping technique may be the technique consisting of winding ribbons made of composite material around a tubular metal body. This hooping technique is described in particular in documents FR 2,828,121, FR 2,828, 262, and U.S. Pat. No. 4,514,254.

Alternatively, tubes 1 and 3 can be self-hooped: the hooping constraint is introduced during hydraulic testing of the tubes at a pressure causing the elastic limit of the metal tube to be exceeded. In other words, the ribbons of composite material are wound around the metal tube. During the winding operation, the ribbons bring about little or no stress in the metal tube. Then a specific pressure is applied to the inside of the tube such that the stress in the metal exceeds the elastic limit of the metal and the tube deforms plastically. The pressure can be applied in the tube by introducing a fluid under pressure. After the return to zero pressure, residual compression stresses remain in the metal tube, and tensile stresses remain in the ribbons of composite material.

Alternatively, the self-hooping operation is performed after the elementary tubes have been assembled. The reinforcing elements can be disposed around the metal tube without inducing a stress in the metal tube, so that during the winding operation the ribbons bring about little or no stress in the metal tube. Then the tubes covered with reinforcing elements are assembled according to the assembly process described below. Stressing the reinforcing elements is done after the operation of assembling tubes 1 and 3: the reinforcing elements are stressed by applying a predetermined pressure in the tube assembly such that the stress in the metal exceeds the elastic limit of the metal and the tube deforms plastically.

In all cases, with reference to FIG. 1, the ends of tubes 1 and 3 have no reinforcing elements in an area G of axial length d1. The length d1 is chosen so as to avoid damaging reinforcing elements 2 and 4 by excessive heat during the welding operations. The bare surface at each end of the tubes facilitates the welding operations and, in particular, enables the heat to be dissipated when tubes 1 and 3 are welded. The bare length d1 can be determined after tests measuring the temperature profile in the metal tube during the various welding operations. The length d1 can be between 100 mm and 300 mm.

One end of tube 1 is connected to one end of tube 3 by the weld 5. The welding operation is conducted such that tube 1 and tube 3 are substantially coaxial, i.e. have the same axis A-A'.

A sleeve 6 consolidates the assembly of tubes 1 and 3 at the weld 5. Preferably, the sleeve has a cylindrical inside shape. For example, sleeve 6 can be a tube section covering tubes 1 and 3. The axis of sleeve 6 corresponds substantially to the axis A-A' of tubes 1 and 3. Sleeve 6 completely covers the bare areas G of tubes 1 and 3, and part of the reinforcing elements 2 and 4 corresponding to areas F in FIG. 1. An area F extends over an axial length d2. In general, the length d2 is chosen to be approximately equal to the length d1. For example, area F extends over an axial length d2 that is between 100 mm and 300 mm.

Figure 2:
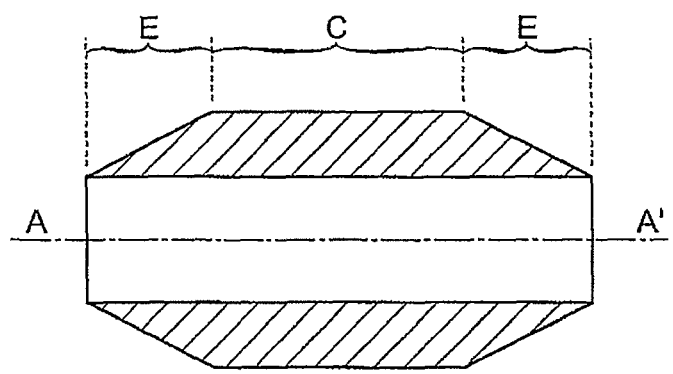
FIG. 2 shows a cross section of a sleeve.

FIG. 2 shows an alternative shape of sleeve 6: the ends of the sleeve are beveled. In FIG. 2, the sleeve has a tube-shaped center part C. The ends of center part C are extended by parts E which have a conical shape. The inside surface of the sleeve in parts E and C forms a cylindrical surface with a constant radius. On the other hand, the thickness of the sleeve, which is constant in center part C, tapers over conical parts E until it becomes almost zero. Thus, the conical shape of parts E provides a transition from the standpoint of mechanical strength between the hooped tube and the welded area reinforced by the sleeve.

The inside diameter of sleeve 6 is equal to or slightly greater than the diameter of the cylinder formed by the outer surfaces of hoops 2 and 4. The inside diameter of sleeve 6 can be determined by taking into account the oval deformations of the hooped tubes and the manufacturing tolerances of the hooped tubes.

Sleeve 6 forms, with tubes 1 and 3, a closed annular space, said space being axially delimited by reinforcing elements 2 and 4. The annular space extends over areas G. This annular space is filled with an injectable setting material. The polymer is injected through injection hole 7 in order to fill the entire space and thus form an element 9 that transits forces between tubes 1 and 3 and sleeve 6. Element 9 can transmit to sleeve 6 the radial forces generated by the internal pressure on tubes 1 and 3. Conversely, the element 9 can transmit to tubes 1 and 3 radial forces generated by the external pressure on sleeve 6. The material of element 9 is chosen particularly for its mechanical characteristics: the material must be able to transmit forces between the steel tubes and the sleeve. For example, the material comprises a thermoplastic or thermosetting polymer, possibly mixed with a filler such as carbon, glass, or aramide fibers.

The sleeve can be provided with an escape hole 8 so that the air can be evacuated when the polymer is injected. This prevents air pockets from remaining in the annular space between the sleeve 6 and the steel tubes 1 and 3, which air pockets would damage the transmission and distribution of stresses between the tubes and the sleeve. Preferably, the injection hole 7 and escape hole 8 are located diametrically opposite and at the opposite ends of the sleeve to favor filling of the annular space between the sleeve 6 and tubes 1 and 3.

The inside surface of the sleeve can have striations or grooves to improve the adhesion of the material forming element 9 to the sleeve 6.

Preferably, the characteristics of the sleeve 6 are chosen such that the mechanical assembly constituted by sleeve 6, areas G of tubes 1 and 2, and element 9 has greater resistance to internal pressure than that of tubes 1 and 3 reinforced by reinforcing elements 2 and 4. For example, the type of steel, the dimensions and geometry of sleeve 6, and the materials of element 9 can be chosen. For example, the type of steel for the sleeve can have greater mechanical strength than the steel of tubes 1 and 3.

The end to end welding of the hooped tubes for creating an assembly according to FIG. 1 can be effected by the steps described below.

The reinforcing elements are each wound around each of the metal tubes, leaving the tube ends clear in area G. The ribbons can be tension-wound around the metal tubes to bring about stresses in the metal tube. The ribbons can also be wound while bringing about very little or no stress in the metal tubes. In this case, a hydraulic test can be applied to the metal tube to stress the metal tubes and reinforcing elements by self-hooping. This hydraulic test can also be applied at a later time.

It is possible, before the welding operation, to thread the sleeve around one of the hooped tubes to be welded, i.e. by sliding the sleeve around one of the hooped tubes.

The hooped tubes are placed end to end and the weld 5 is created. The weld can be checked nondestructively, for example by x-ray or ultrasound, to verify that the weld is defect-free.

The sleeve 6 is brought into position above weld 5.

Means for holding the sleeve in position are disposed above weld 5. For example, two clamps can be tightened onto hoops 2 and 4 and onto sleeve 6 to prevent the sleeve 6 from moving along axis A-A'.

Material is injected through orifice 8 into the annular space between sleeve 6 and tubes 1 and 3. In the case of thermosetting resins, the resin is polymerized by raising the temperature and applying pressure, for example.

In the case where the reinforcing elements are merely wound around the metal tubes without stressing them, a hydraulic test is applied to the pipe element formed by assembling tubes 1 and 3 in order to stress the metal tubes and reinforcing elements by self-hooping.

A high-pressure pipe element composed of welded, hooped tubes is obtained according to the invention. The material 9 injected between the sleeve and the tube transmits radial forces between the metal tubes and the sleeve so that the latter participates in the strength of the pipe element and hence limits the mechanical forces applied to the weld 5.

Figure 3:
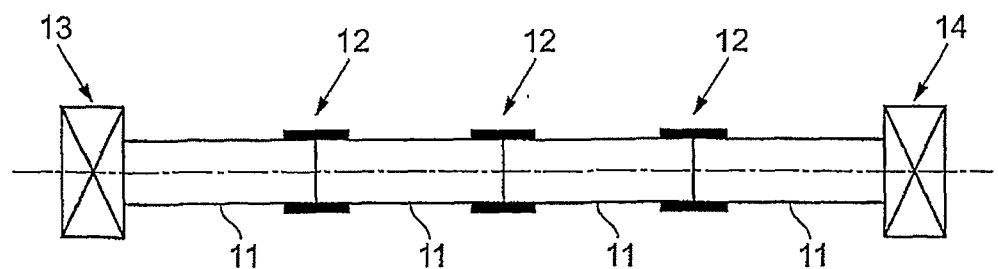
FIG. 3 shows schematically a high-pressure pipe according to the invention.

Moreover, the method of assembling hooped tubes according to the invention enables long hooped pipes to be made from elementary tube sections that are easily made and handled. High-pressure pipe elements can be made by assembling several elementary tubes, for example between 4 and 20 elementary tubes. FIG. 3 shows an example of a high-pressure pipe with four elementary tubes 11 connected to each other by connections 12 made according to the invention. The ends of the high-pressure pipe are provided with mechanical connectors 13 and 14 enabling two high-pressure pipes to be connected.

The method according to the invention can be used for end-to-end assembly of elementary tubes when a pipeline is being laid to create a line between the sea bed and the surface that can be several hundred meters long.

Preferably, high-pressure pipe elements are made in two steps. First, the metal tubes are covered with composite ribbons in a plant specially equipped with production means intended for this application. This plant allows tubes with various diameters, thicknesses, and lengths to be worked. Then, in a second step, the metal tubes covered with reinforcing elements are transported in batches to a second plant which assembles the covered metal tubes. Preferably, the assembly plants are dedicated to a particular type of tube. This method has advantages from the standpoint of manufacturing the elementary tubes, transporting them to the assembly sites, and assembling them. In particular, the transportation of high-pressure piping can be facilitated by locating the assembly plant near the utilization site. Manufacturing rates can be high and easily stepped up, if necessary, by adding new standard machines.

The invention claimed is:

1. A high-pressure pipe element, comprising at least two metal tubes reinforced by hoops, the ends of the tubes being bare ends not reinforced by hoops, the tubes being assembled end to end by welding the bare ends, a sleeve covering the weld as well as a portion of the hooping of each tube forming an annular space between the bare ends of tubes and the sleeve, said space being filled with an injectable and setting material, wherein the sleeve has ends of conical shape, a length of the portion of the hooping of each tube covered by the sleeve is approximately equal to a length of the bare end of each tube covered by the sleeve, and the sleeve is configured such that the assembly constituted by the sleeve, the space filled with the injectable, setting material, and the bare ends of the tubes, has greater internal pressure resistance than an internal pressure resistance of the metal tubes reinforced by hoops.

2. The high-pressure pipe element according to claim 1, wherein the inside surface of the sleeve has striations.

3. The high-pressure pipe element according to claim 1, wherein the hooping has reinforcing elements made of fibers embedded in a polymer material.

4. The high-pressure pipe element according to claim 1, wherein the injectable, setting material comprises a polymer.

5. The high-pressure pipe element according to claim 1, wherein the sleeve includes an interior cylindrical surface of constant radius along an entire length of the sleeve.

6. A high-pressure pipe element, comprising at least two metal tubes reinforced by hoops, the ends of the tubes being bare ends not reinforced by hoops, the tubes being assembled end to end by welding the bare ends, a sleeve covering the weld as well as a portion of the hooping of each tube forming an annular space between the bare ends of tubes and the sleeve, said space being filled with an injectable and setting material, wherein the sleeve has ends of conical shape, a length of the portion of the hooping of each tube covered by the sleeve is approximately equal to a length of the bare end of each tube covered by the sleeve, and the sleeve is configured such that the assembly constituted by the sleeve, the space filled with the injectable, setting material, and the bare ends of the tubes, has greater internal pressure resistance than an internal pressure resistance of the metal tubes reinforced by hoops, and wherein the sleeve is made of a material having a greater mechanical strength than the mechanical strength of the metal of the tubes.

7. The high-pressure pipe element according to claim 6, wherein the inside surface of the sleeve has striations.

8. The high-pressure pipe element according to claim 6, wherein the hooping has reinforcing elements made of fibers embedded in a polymer material.

9. The high-pressure pipe element according to claim 6, wherein the injectable, setting material comprises a polymer.

10. The high-pressure pipe element according to claim 6, wherein the sleeve includes an interior cylindrical surface of constant radius along an entire length of the sleeve.

\* \* \* \* \*